Jan. 19, 1932.     A. L. BREITENSTEIN     1,842,145
MOLD ENGRAVING MACHINE
Filed Jan. 27, 1926     3 Sheets-Sheet 1
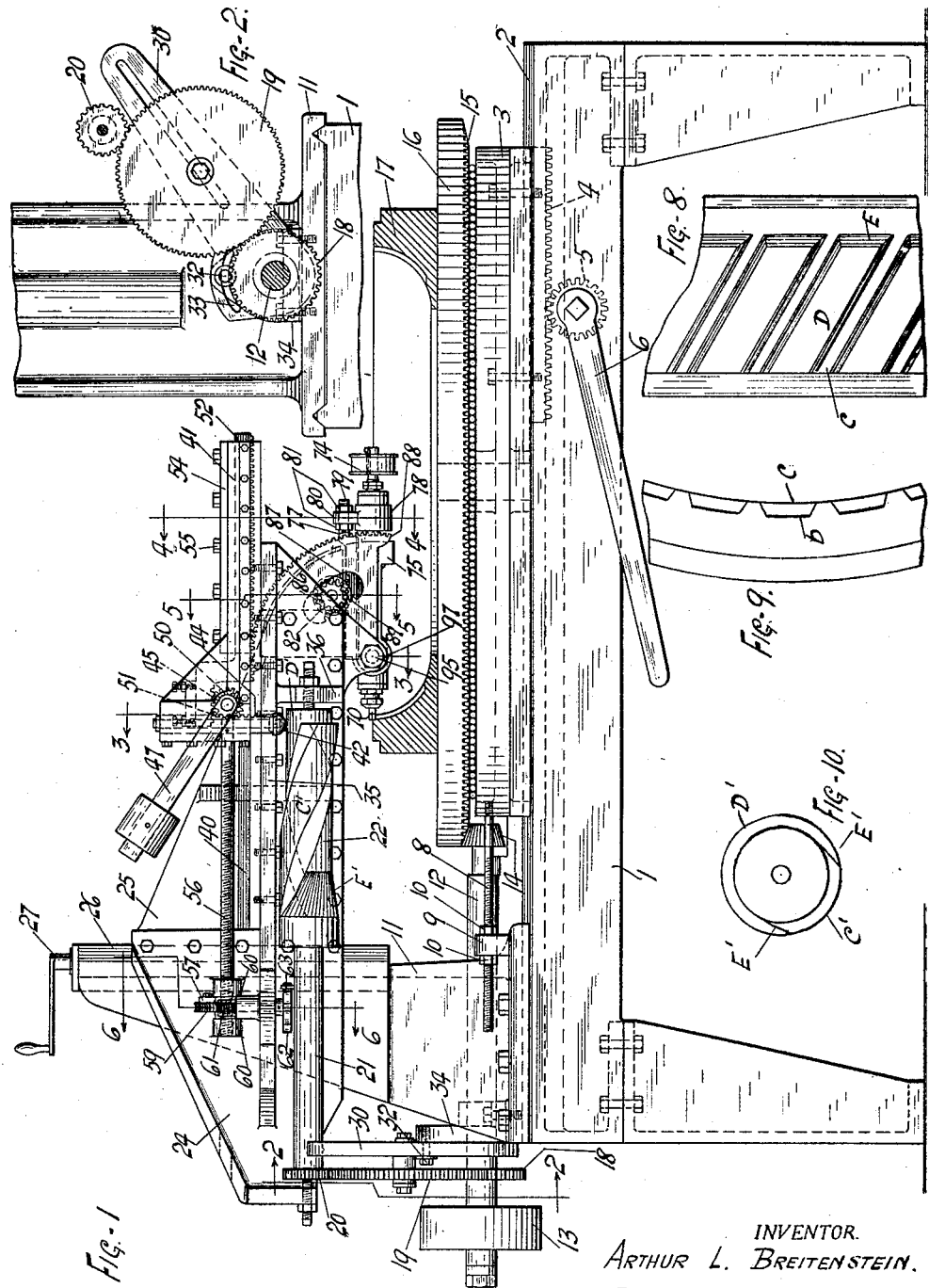
INVENTOR.
ARTHUR L. BREITENSTEIN.
BY
ATTORNEY.

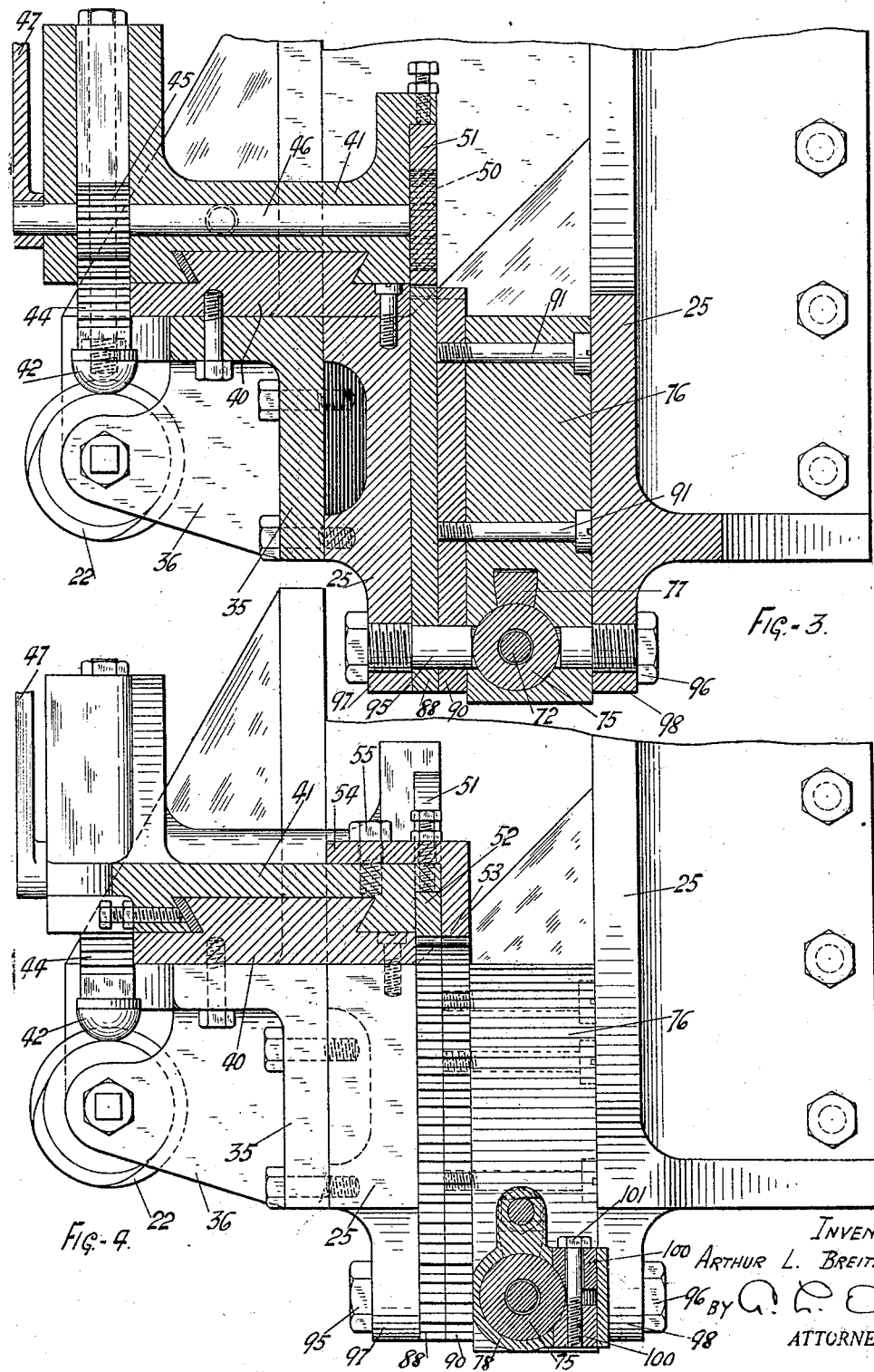

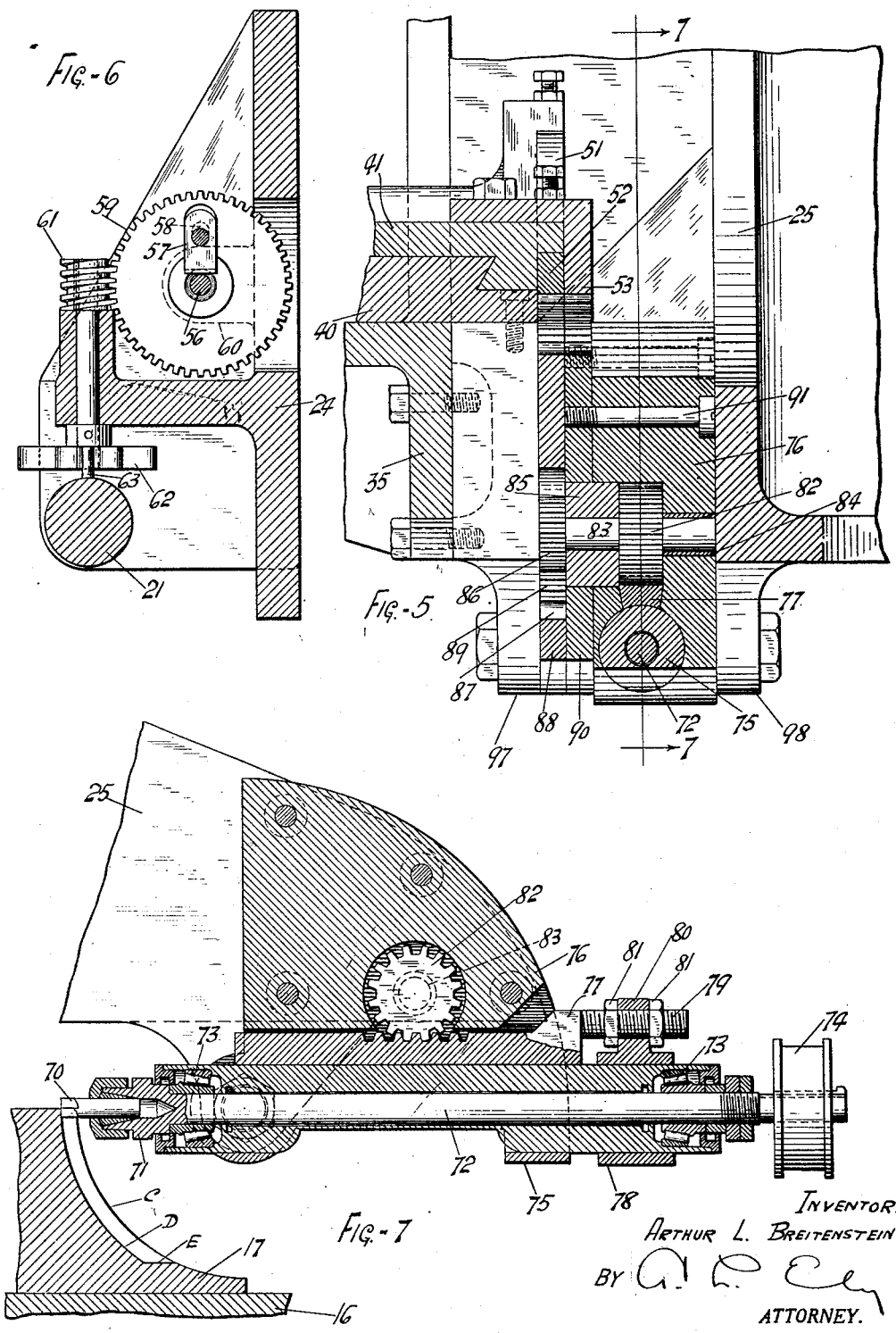

Patented Jan. 19, 1932

1,842,145

UNITED STATES PATENT OFFICE

ARTHUR L. BREITENSTEIN, OF AKRON, OHIO; MAUDE E. BREITENSTEIN ADMINISTRATRIX OF SAID ARTHUR L. BREITENSTEIN, DECEASED

MOLD ENGRAVING MACHINE

Application filed January 27, 1926. Serial No. 84,092.

The present invention relates to the art of engraving or cutting designs within molds used for the manufacture of automobile tires, the machine shown herein being designed for cutting in the mold the recesses which form the non-skid tread upon the tire.

Machines for the cutting of non-skid tire molds have been manufactured heretofore, but, so far as known to me, such machines have required the constant attention of an operator and the resetting of the mold for the cutting of each unit of design therein. The object of my present invention and the advantage obtained by the machine shown herein are in the designing of an entirely automatic machine, which, when once set in operation, will complete the cutting of a tire mold without any attention from the operator.

The machine shown herein constitutes one embodiment of my invention only, it being understood that the scope of the invention is not necessarily limited to the details which are shown and described. In this embodiment of the invention, there is provided a rotating pattern roll which is designed to reproduce the pattern to be cut in the mold, so that by operation of the machine the pattern is reproduced in the curved surface of the mold. A very simple pattern is shown in this apparatus, but it will be evident from the description of the machine that any pattern, however complicated, may be reproduced.

In the drawings:

Figure 1 is a side elevation of an automatic tire-mold cutting or engraving machine, showing the features of the invention and showing a mold, in section, mounted thereon;

Figure 2 is a section on the line 2—2 of Figure 1, showing the drive connection between the mold rotating table and the pattern;

Figure 3 is a section on the line 3—3 of Figure 1;

Figure 4 is a section on the line 4—4 of Figure 1;

Figure 5 is a section on the line 5—5 of Figure 1;

Figure 6 is a section on the line 6—6 of Figure 1;

Figure 7 is a section on the line 7—7 of Figure 5;

Figure 8 is a view, in elevation, showing a surface of the mold such as would be cut by the use of the pattern roll shown in the drawings;

Figure 9 is a top view; and

Figure 10 is an end view of the pattern roll.

Briefly set forth, the machine designed by me comprises a rotating table upon which the mold is clamped and a rotating pattern roll upon which the design to be cut is laid out so as to properly govern the movement of the tool. The pattern roll and the mold are rotated in unison. With the pattern roll there is associated a pattern follower or pin which, through suitable gearing, is connected with the tool spindle to withdraw or advance the tool in accordance with the predetermined design laid out upon the pattern roll. Associated with the pattern roll is an automatic feed device which is connected to the pivoted sector for carrying the tool, so that at intervals the latter is rocked to cut a fresh line about the mold.

In the operation of the machine, the tool cuts about a series of circles about the axis of the mold, the points at which the tool is advanced to cutting positions and the extent of advance, and thus the depth of the cut, being controlled by the pattern roll. While this particular operation is shown and described, it is obvious that the principles of the invention may be utilized in different machines and in different ways, after the principles of the present machine have been made clear.

The machine is mounted upon a bed plate 1, upon the upper surface of which is formed a guideway 2 for the mold supporting carriage 3. The position of the carriage 3 may be adjusted for different sizes of molds by a rack 4 and pinion 5 having an operating lever 6. A threaded shaft 8 passing through a lug 9 upon the machine and having lock nuts 10 at either side of the lug fixes the mold table in its adjusted positions.

Fixed to the bed of the machine is a standard or housing 11 through which passes the main drive shaft 12, having the driving pulley 13 at one end thereof and a small, bevel pinion 14 at the other end thereof which meshes with the large bevel gear 15 formed on the underside of the rotating mold supporting table 16. The tire mold clamped upon the table is indicated at 17.

Upon the shaft 12 is carried a drive pinion 18 which meshes with an intermediate gear 19 and thus drives the smaller gear 20 which is carried upon and rotates the shaft 21 of the pattern roll or drum 22. The ratio of the gearing described determines the number of times the given pattern is to be reproduced in the mold, and it is apparent that by changing the gearing the ratio of rotation of the mold and the pattern roll can be changed, so that the units of the pattern will be repeated a determined number of times about the circumference of the mold.

The tool, pattern roll and other parts to be described are carried by a vertically adjustable head 25 which is slidably mounted upon a vertical guideway 26 formed upon the face of the housing 11, the vertical position of the head being adjusted by the screw feed 27, this arrangement being desirable for adjusting the machine for cutting molds of varying depths. The gear 19 is carried upon a swinging bracket or quadrant 30 so that its position can be changed for the adjustments described, the angular position of the bracket being fixed by a set screw 32 which passes through an arcuate slot 33 formed in the bracket 30 and into a bracket 34 on the standard 11. One end of the pattern roll shaft is carried in a bracket 24 projecting rearwardly from the head 25. The other end of the shaft is supported in an angular bracket 36 which is formed on the underside of an extension 35 of the bracket 24.

Upon the upper surface of the head 25 and the extension 35 is secured a stationary guideway 40 upon which is mounted the carriage 41, which, by connections to be described, governs the rocking of the cutting tool about its axis. This slide also carries the pattern follower 42 which is moved in a vertical direction by the pattern to govern the cutting depth of the tool, which is determined by the pattern roll. It will be seen, therefore, that the location and amount of cut to be taken by the tool are governed by the pattern roll, which is in the form of a long cylinder, the surface of the cylinder corresponds to the surface of the mold over which the tool passes.

A yieldingly mounted pattern follower 42, the face of which is rounded, is fastened to the lower end of a rack 44, with which is meshed a pinion 45 carried by the horizontal shaft 46 mounted in the carriage 41. A weighted arm 47 on the shaft 46 holds the follower 42 in contact with the surface of the pattern at all times. The shaft 46 is extended through the slide and carries at its inner end a pinion 50 which meshes with a short, horizontal rack 51. The rack 51 is formed as an offset to a main rack 52 which is slidably mounted in the carriage 41 which projects over the mold. To the carriage 41 is also secured a fixed rack 53, which is provided with a flange 54 overlying the carriage and secured thereto by bolts 55. The main portion of the rack 53 is located at the side of the rack 52.

The purpose of the rack 52 is to govern the depth of the cutting tool which is accomplished by connections to be described, and the rack is controlled for this purpose by the pattern follower 42, which, as it is moved by the projections or depressions in the pattern roll, correspondingly moves the rack. The purpose of the rack 53 is to govern the angular position of the tool with respect to the mold, this also being accomplished by connections to be later described. For this purpose the rack 53, being fastened to the carriage 41, is moved thereby.

The carriage 41 is shown in Figure 1 at its extreme outward position at which time the tool is at the highest point in the mold. A feed screw 56 is fastened to the rear of the carriage 41 and is threaded through a half nut 57 at its rear end, the nut being movable upon slot 58 out of engagement with the screw when it is desired to set the carriage. The nut 57 is carried upon the face of a worm gear 59 which is rotatable upon the screw 56 between bearing lugs 60 formed on the face of the bracket 24. The worm gear is rotated by a vertical worm shaft 61, which carries at its lower end the star wheel 62, the latter being rotated a step at a time by a pin 63 carried by the pattern wheel shaft 21. It will thus be seen that a very slow feed is given to the carriage 41 in unison with the rotation of the pattern wheel and the rotation of the mold upon its axis, the travel of the carriage 41 being calculated to advance the tool over the mold surface at the proper speed to cut the entire pattern within the mold without any attention upon the part of the operator of the machine. Once the machine has been set, the rotation of the mold and the pattern is continuous and the cutting of the mold proceeds automatically.

The cutting tool is indicated at 70, being of the usual milling cutter type. It is secured in a bit 71 mounted on the end of a rotating spindle 72, which is mounted in bearings 73 and driven by a belt pulley 74, or some other source, so that it is constantly rotated. The spindle and bearings are carried in a tubular sleeve or housing 75 which is mounted for longitudinal movement in the lower side of a sector-shaped plate 76. A rack 77 is mounted on the upper surface of the housing 75, being secured thereto by a collar 78 which passes around the projecting end of the housing 75, through the medium of a screw-threaded shaft 79 which passes through a lug 80 on the collar. Lock nuts 81 on either side of the lug secure the rack in any adjusted position with respect to the spindle housing 75. The collar and the sleeve 75 are secured together by the lock bushings 100, connected by bolt 101 (Figure 4).

The rack 77 is in mesh with a pinion 82 carried upon a shaft 83 which is mounted in bearings 84 and 85 in the sector plate 76. The front end of the shaft 83 carries a small pinion 86 which passes through a curved slot 87 cut in a movable sector gear 88. One side of the slot 87 is formed with rack teeth 89 with which the pinion 86 engages.

Between the movable sector gear 88 and the sector plate 76 is arranged a second sector gear 90 which is fastened to the plate by bolts 91.

The sector gear 88 is in mesh with the movable rack 52 and the sector gear 90 with the fixed rack 53. The sector gears and the sector plate are pivoted on the aligned pins 95 and 96 which are carried in depending brackets 97 and 98, respectively, which are formed as a part of the head 25, the pivot point being located at the center of transverse curvature of the mold.

It will be observed that there are three surfaces of the engraved mold, which may be designated as C, D and E, (Figures 8 and 9), respectively, the primary surface C being the original or uncut surface of the mold, the secondary surface D being the deepest surfaces on the cuts, and the tertiary surfaces E, which connect these surfaces, these forming obverse surfaces on the tire which is to be molded therein. These surfaces are reproduced in the pattern roll (Figure 10), the primary surface C' being the outer periphery of the roll, the secondary surface D' being the inner or smaller circumference, and the tertiary surfaces E' being those surfaces which connect the other two surfaces and which may be inclined to conform to the inclination of the walls E in the mold. The location of the surfaces E' determine the pattern to be cut in the mold. By varying the shape of the various surfaces of the pattern roll, any desired design can be reproduced in the mold. By forming the surface D' as a cone in whole or in part, the cuts may be made of varying depths about the transverse curvature of the mold.

The operation of the machine will now be readily understood. The mold 17 is rotated constantly upon its axis and the tool is also constantly rotated. The tool is projected or retracted in accordance with the configuration of the pattern roll which rotates a given number of complete turns with each rotation of the mold. When the pattern follower rides up the surfaces E' towards the high surfaces C' of the pattern roll, the tool is retracted through the medium of the gears 45 and 50 which withdraws the movable rack 52, rocking the sector 88, which through gears 86 and 82 retracts the spindle carrier 75. As the pattern follower rides down the surfaces E', the tool is advanced into the mold. After a complete rotation of the mold the tool will have cut a short section of the pattern in the mold. During the rotation of the mold, the star wheel 62, through the worm 59 and threaded shaft 56, withdraws the carriage 41, rocking the fixed sector 90 which, in turn, moves the whole tool carrier through an angular distance sufficient to advance the tool still further down the curvature of the mold and at the same time moves the pattern follower along the pattern roll so that it rides over a new surface thereof and changes the pattern to be cut in the mold accordingly. After the machine has been set in operation, no further attention is required for the cutting of the pattern proceeds automatically.

It will be appreciated that, having disclosed the principles of the invention, other embodiments than those shown and described may be made. Alterations, modifications and specifically different means for accomplishing the results sought for may be designed by one skilled in the art, without in any manner departing from the essential features and scope of the invention as set forth in the claims appended hereto.

It will be understood that such changes and modifications as fall within the full scope of the invention are intended to be covered by the following claims, which indicate and set forth what is intended to be covered by Letters Patent.

What is claimed is:

1. In a machine for engraving repetitions of a unit pattern in tire molds or the like, the combination of a rotating pattern having formed thereon surfaces corresponding to a unit of said pattern, a cutting tool for the mold reciprocable in a straight line and arcuately movable over the mold surface, a control device for said tool, means to rotate the pattern and the mold at differential speeds whereby said pattern unit will be reproduced on said mold a determined number of times, and means to move the control device over the entire surface of the pattern and simultaneously to move the tool reciprocably and in an arc.

2. In a machine for engraving tire molds or the like, a rotating pattern drum having an outer surface and a depressed inner surface, one of said surfaces corresponding to the uncut surface of the mold and the other surface to the deepest portion of the cut, other surfaces connecting the two surfaces aforesaid, which latter surfaces determine the pattern to be cut in the mold, a cutting tool for the mold, a control device for said tool movable over the entire surface of the drum, and reduction gearing to rotate the mold upon its axis in unison with the rotation of the drum but at a differential speed thereto.

3. In a machine for engraving tire molds, a rotating pattern, a pattern follower adapted to traverse the entire surface of the pattern, the pattern being provided with elevations and depressions corresponding to the design to be reproduced, a tool holder, a rotating cutting tool, means for arcuately moving the tool over the surface of the mold, and connections between the follower and the tool adapted to withdraw or advance the tool in the tool holder in accordance with the movement of the pattern follower.

4. In a machine for engraving tire molds, a rotating pattern having elevations and depressions corresponding to the design to be reproduced in the mold, a tool holder, a rotating cutting tool over the mold, means for arcuately moving the tool over the surface of the mold, a pattern follower movable by the pattern, and connections between the tool and the pattern to advance or retract the tool in the holder relative to the mold.

5. In a machine for engraving tire molds, a rotating pattern, a pattern follower movable by the pattern, a reciprocating and rotating cutting tool over the mold, means for arcuately moving the tool over the surface of the mold, and connections between the follower and the tool to advance or retract the tool independently of its arcuate movement to reproduce the pattern in the mold.

6. In a machine for engraving tire molds, a rotating drum, a pattern follower adapted to traverse the entire surface of the drum, the drum being provided with elevations and depressions corresponding to the pattern to be reproduced, a rotating cutting tool, connections between the follower and the tool adapted to withdraw or advance the tool in accordance with the movement of the pattern follower, a rotating table for the mold, and connections between the table and the drum to rotate the drum a determined number of times with respect to one rotation of the table.

7. In a machine for engraving tire molds, a rotating drum having elevations and depressions corresponding to the pattern to be reproduced in the mold, a rotating cutting tool over the mold, means for rotating said cutting tool, a pattern follower movable by the drum, connections between the tool and the drum to advance or retract the tool relative to the mold, a rotating table for the mold, and connections between the table and the drum to rotate the drum a plurality of times with respect to one rotation of the table so that a plurality of identical engravings on said mold will be formed.

8. In a machine for engraving tire molds, a rotating pattern drum, a pattern follower movable by the drum, a reciprocating and rotating cutting tool over the mold, connections between the follower and the tool to advance or retract the tool to reproduce the pattern in the mold, a rotating table for the mold, and connections between the table and the drum to rotate the drum a plurality of times with respect to one rotation of the table.

9. A machine for engraving tire molds comprising a rotating pattern and a rotating mold, means to drive said elements at different speeds and at a fixed ratio, a pattern follower bearing against the pattern, a cutting tool movable in a straight line toward and from the mold, and connections between the tool and the follower adapted to move the tool.

10. A machine for engraving tire molds comprising a rotating pattern drum, a reciprocating tool spindle, a yielding follower adapted to move over the drum, means operated by said follower to reciprocate the tool spindle in a straight line, and means operating in synchronism with said rotating pattern drum for periodically stepping said tool spindle with an arcuate movement over the mold.

11. A machine for engraving tire molds comprising a pattern, a reciprocating tool spindle, a yielding follower bearing against the pattern, connections between the spindle and the follower to reciprocate the spindle in a straight line, and means operating in synchronism with said rotating pattern drum for periodically stepping said tool spindle with an arcuate movement over the mold.

12. A machine for engraving tire molds comprising a rotating pattern drum, a reciprocating tool spindle, a yieldingly mounted follower bearing against the pattern, means to connect the follower and the spindle to reciprocate the spindle, and feeding means to move the follower along the drum and to simultaneously move the tool spindle arcuately of the mold.

13. A machine for engraving tire molds comprising a rotating pattern drum, a reciprocating tool spindle, a pivoted mounting for said spindle, a yielding follower bearing against the drum, means to translate the movement of the follower to a reciprocation of the spindle, feeding means to move the follower over the drum, and means to arcuately move the spindle over the mold in unison with the feeding means.

14. A machine for engraving tire molds, comprising a rotating mold table, a rotating pattern drum connected therewith, a follower contacting the pattern and movable thereby, feeding mechanism to move the follower along the axis of the drum, a cutting tool, a pivoted and reciprocating mounting therefor, and means to translatorily reciprocate the tool mounting in accordance with the pattern actuated movement of the follower and to rock it about its pivot in accordance with the feeding movement.

15. A machine for engraving tire molds, a rotating pattern drum, a follower movable radially of the drum by the configuration of the pattern and also movable longitudinally of the drum by a feeding mechanism, a cutting tool movable in the direction of its length and also movable about an axis, and connections between the follower and the tool adapted to coordinate the movements of the said elements.

16. A machine for engraving tire molds, a rotating pattern drum, a rotating mold table, driving connections between the said elements, a follower radially movable by the configuration of the pattern and also longitudinally movable over the drum by a feeding mechanism, a cutting tool movable in the direction of its length and also movable about an axis, and connections between the follower and the tool adapted to coordinate the movements of the said elements.

17. In a machine for engraving tire molds, a pattern drum having a surface corresponding to the uncut surface of the mold and a surface corresponding to the deepest cut therein, surfaces connecting the aforementioned surfaces, a yielding follower movable over and by the configuration of the drum, a reciprocating cutting tool movable in a straight line by the follower, and means for arcuately moving the tool over the mold.

18. In a machine for engraving tire molds, a rotating pattern drum having a surface corresponding to the uncut surface of the mold and a surface corresponding to the deepest cut therein, surfaces connecting the aforementioned surfaces, a yielding follower movable by the configuration of the drum, feeding mechanism to advance the follower along the axis of the drum, and a reciprocating and rocking tool reciprocated by the movement of the follower and rocked in unison with the feed thereof.

19. In a machine for cutting non-skid patterns in tire molds, a pattern and means for rotating a mold, a cutting tool, a pattern follower, means to cause the pattern follower to traverse the entire surface of the pattern, and connections between the pattern follower and the tool to cause corresponding movements of the tool in the direction of its length.

20. In a machine for cutting non-skid patterns in tire molds, a rotating pattern drum and means for rotating a mold, a cutting tool, a pattern follower, means to cause the pattern follower to traverse the entire surface of the pattern drum, and connections between the pattern follower and the tool to cause corresponding movements of the tool in the direction of its length.

21. In a tire mold engraving machine, a support for a mold, a bracket secured above said support, a plate pivoted on said bracket adjacent the support and at the center of curvature of a mold, a rotating and reciprocating cutting tool mounted in the plate, means for reciprocating the cutting tool during the operation of the machine to vary the depth of the cut in a mold, and automatic means for periodically stepping said plate about its pivot to arcuately move the cutting tool over the mold surface.

22. In a tire mold engraving machine, a support for a mold, a bracket secured above said support, a plate pivoted on said bracket adjacent the support and at the center of curvature of a mold, a rotating and reciprocating cutting tool mounted in the plate, pattern controlled means for reciprocating the cutting tool during the operation of the machine to vary the depth of the cut in a mold, and automatic means for periodically stepping said plate about its pivot to arcuately move the cutting tool over the mold surface.

23. In a tire mold engraving machine, a support for a mold, a bracket secured above said support, a plate pivoted on said bracket adjacent the support and at the center of curvature of a mold, a rotating and reciprocating cutting tool mounted in the plate, means for reciprocating the cutting tool during the operation of the machine to vary the depth of the cut in a mold, and means operable simultaneous with said reciprocating means for rocking the sector plate to change the angular position of the tool with respect to a mold.

24. In an engraving machine for a tire mold, a frame, a support on said frame adapted to carry a mold, a bracket on said frame, a support for a mold, a plate pivoted adjacent the support and on said bracket at the center of curvature of a mold, a rotating and reciprocating cutting tool mounted in the plate, pattern controlled means for reciprocating the cutting tool during the operation of the machine to vary the depth of the cut in a mold, and means for rocking the sector plate to change the angular position of the tool with respect to a mold during the reciprocating movement thereof.

25. In a tire mold engraving machine, a support for a mold, a sector plate pivoted at the center of curvature of a mold for angular adjustment relative to the surface of the mold, a rotating cutting tool, a reciprocating spindle for said tool, a sector gear movable with respect to the plate, and gearing connecting the sector gear and the spindle for varying the depth of cut in a mold.

26. In a tire mold engraving machine, a support for a mold, a sector plate pivoted at the center of curvature of a mold for angular adjustment relative to the surface of the mold, a cutting tool, a rotating reciprocating spindle for said tool carried on said plate, a sector gear movable with respect to the plate and pivoted therewith, gearing connecting the sector gear and the spindle for reciprocating the spindle to vary the depth of cut in a mold, a pattern and pattern follower, and connections between the pattern follower and the sector gear.

27. In a tire mold engraving machine, a support for a mold, a plate pivoted adjacent the support and at the center of curvature of a mold, a cutting tool, a reciprocating rotatable spindle for said tool carried on said plate, a sector gear movable with respect to the plate and pivoted concurrently therewith, a rack on the spindle and a rack on the sector gear, pinions connecting the said racks, and means for moving the sector gear whereby the spindle will be reciprocated.

28. In a tire mold engraving machine a support for a mold, a plate pivoted adjacent the support and at the center of curvature of a mold, a cutting tool, a reciprocating rotatable spindle for said tool carried on said plate, a sector gear movable with respect to the plate and pivoted concurrently therewith, a rack on the spindle and a rack on the sector gear, pinions connecting the said racks, a pattern and a pattern follower, and a rack movable by the pattern follower and meshing with the sector gear.

29. In a tire mold engraving machine frame, a support for a mold, a plate pivoted on said frame at the center of curvature of a mold, a rotating and reciprocating cutting tool carried by the plate, a sector gear on said frame movable with respect to the plate and adapted to reciprocate the tool, a fixed sector gear on the plate, a pattern drum, a pattern follower, connections between the pattern follower and the movable sector gear, a slide on said frame carrying the pattern follower, a rack fastened to the slide and meshing with the fixed sector gear, and feed mechanism for moving the pattern follower along the axis of the pattern drum.

30. In a tire mold engraving machine frame, a support for a mold, a plate pivoted on said frame at the center of curvature of a mold, a rotating and reciprocating cutting tool carried by the plate, a sector gear on said frame movable with respect to the plate and adapted to reciprocate the tool, a rotating pattern, a yielding pattern follower movable over the entire surface of the pattern, and a rack movable by the follower and meshing with the movable sector gear.

31. In a tire mold engraving machine frame, a support for a mold, a plate pivoted on said frame at the center of curvature of a mold, a rotating and reciprocating cutting tool carried by the plate, a sector gear on said frame movable with respect to the plate and adapted to reciprocate the tool, a rotating pattern, a yielding pattern follower movable over the entire surface of the pattern, a rack movable by the follower and meshing with the movable sector gear, a fixed sector gear on the plate, a rack meshing therewith, and means to move the rack and the pattern follower parallel to the axis of the pattern.

32. In a tire mold engraving machine, means for rotating a mold and a rotating pattern representing a unit to be cut in the mold, means for rotating the pattern a plurality of revolutions with respect to one revolution of the mold, a pattern follower and a cutting tool connected for similar movements, and means for feeding the follower so that it traverses the entire surface of the pattern.

33. In a tire mold engraving machine, means for rotating a mold and a rotating pattern drum having elevations and depressions representing a unit to be cut in the mold, means for rotating the pattern a plurality of revolutions with respect to one revolution of the mold, a yielding pattern follower bearing against the drum, a reciprocating cutting tool connected therewith so as to have corresponding movements, a pivotal mounting for the tool, means for moving the follower along the axis of the drum, and means for causing simultaneous rocking movement of the tool mounting.

34. In a tire mold engraving machine, a cutting tool, a pivot for said cutting tool located at the center of transverse curvature of the mold, means to withdraw and advance the tool longitudinally with respect to the mold to vary the depth of the cut, means for continuously rotating a mold, a pattern, and mechanism to control the tool from the pattern during the entire cutting operation.

ARTHUR L. BREITENSTEIN.